(12) United States Patent
Jung

(10) Patent No.: US 10,193,704 B2
(45) Date of Patent: Jan. 29, 2019

(54) DEVICE CONTROL METHOD AND APPARATUS IN HOME NETWORK SYSTEM

(71) Applicant: Samsung Electronics Co., Ltd., Suwon-si, Gyeonggi-do (KR)

(72) Inventor: Hyun-Ki Jung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 83 days.

(21) Appl. No.: 15/306,650

(22) PCT Filed: Apr. 27, 2015

(86) PCT No.: PCT/KR2015/004170
§ 371 (c)(1),
(2) Date: Oct. 25, 2016

(87) PCT Pub. No.: WO2015/163742
PCT Pub. Date: Oct. 29, 2015

(65) Prior Publication Data
US 2018/0145845 A1 May 24, 2018

(30) Foreign Application Priority Data
Apr. 25, 2014 (KR) .................. 10-2014-0049848

(51) Int. Cl.
*H04L 12/28* (2006.01)
*G06F 3/01* (2006.01)
(Continued)

(52) U.S. Cl.
CPC .......... *H04L 12/2816* (2013.01); *G05B 15/02* (2013.01); *G06F 3/017* (2013.01);
(Continued)

(58) Field of Classification Search
CPC ................ H04L 12/2816; H04L 67/18; H04L 2012/285; G05B 15/02; G06F 3/017;
(Continued)

(56) References Cited

U.S. PATENT DOCUMENTS 7,024,256 B2   4/2006   Krzyzanowski et al.
7,397,357 B2   7/2008   Krumm et al.
(Continued)

FOREIGN PATENT DOCUMENTS

CN   102917271 A   2/2013
CN   103021045 A   4/2013
(Continued)

OTHER PUBLICATIONS

Chinese Office Action dated Dec. 19, 2018, issued in a counterpart Chinese application No. 201580021751.4.

*Primary Examiner* — Tom V Sheng
(74) *Attorney, Agent, or Firm* — Jefferson IP Law, LLP

(57) ABSTRACT

The present invention provides a method and an apparatus for controlling devices in a home network system by using the recognition of motion and an indoor location of a user. A method for controlling devices providing services in a first terminal of a home network system, according to the present invention, comprises the steps of: receiving motion recognition information from a second terminal within a predetermined time after the motion of the first terminal is recognized; checking whether the first terminal is located within an available service range for at least one device; and activating an interface for controlling the at least one device on the basis of the motion recognition information and whether the first terminal is located within the available service range.

14 Claims, 3 Drawing Sheets

(51) Int. Cl.
*G06F 3/0481* (2013.01)
*G06F 3/0346* (2013.01)
*G05B 15/02* (2006.01)
*H04L 29/08* (2006.01)
*G06F 3/0484* (2013.01)

(52) U.S. Cl.
CPC .......... *G06F 3/0346* (2013.01); *G06F 3/0481* (2013.01); *H04L 67/18* (2013.01); *G06F 3/04842* (2013.01); *H04L 2012/285* (2013.01)

(58) Field of Classification Search
CPC ...... G06F 3/014; G06F 3/4842; G06F 3/0346; G06F 3/0481
See application file for complete search history.

(56) References Cited

U.S. PATENT DOCUMENTS

| | | | |
|---|---|---|---|
| 7,624,192 B2* | 11/2009 | Meyers | H04L 67/36 380/270 |
| 8,947,347 B2 | 2/2015 | Mao et al. | |
| 2009/0102836 A1 | 4/2009 | Cha et al. | |
| 2011/0054360 A1 | 3/2011 | Son et al. | |
| 2011/0234543 A1* | 9/2011 | Gardenfors | G06F 3/005 345/175 |
| 2011/0312311 A1 | 12/2011 | Abifaker et al. | |
| 2012/0242599 A1 | 9/2012 | Seo et al. | |
| 2013/0033649 A1 | 2/2013 | Kim et al. | |
| 2013/0201098 A1 | 8/2013 | Schilit et al. | |
| 2103/0257777 * | 10/2013 | Benko | G06F 3/0354 345/173 |
| 2014/0018094 A1 | 1/2014 | Oren et al. | |
| 2015/0042468 A1* | 2/2015 | White | G06F 19/00 340/539.11 |
| 2015/0074613 A1* | 3/2015 | Oswald | G06F 3/017 715/863 |

FOREIGN PATENT DOCUMENTS

| | | |
|---|---|---|
| EP | 1 816 551 A2 | 8/2007 |
| JP | 2009-044247 A | 2/2009 |
| JP | 2012-135642 A | 7/2012 |
| KR | 10-2009-0034674 A | 4/2009 |
| KR | 10-2012-0091980 A | 8/2012 |

* cited by examiner

DEVICE CONTROL METHOD AND APPARATUS IN HOME NETWORK SYSTEM

CROSS-REFERENCE TO RELATED APPLICATION(S)

This application is a National Phase Entry of PCT International Application No. PCT/KR2015/004170, which was filed on Apr. 27, 2015, and claims a priority to Korean Patent Application No. 10-2014-0049848, which was filed on Apr. 25, 2014, the contents of which are incorporated herein by reference.

TECHNICAL FIELD

The present invention relates to a method and an apparatus for controlling a device using the recognition of a motion and an indoor location of a user in a home network system.

BACKGROUND

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched.

Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

Home network technology is a technique for connecting and controlling devices, such as computers, peripheral devices, and home appliances, via a single network in a home. This technology enables not only internal but external access to a network established via an Internet line or a telephone line in a house, thereby controlling all devices including a computer, a television, a video player, and a cooler/heater.

To this end, a protocol for controlling all devices in an integrated manner using a single device in a home is necessary. Thus, wired home network technologies including Ethernet, Home Phoneline Network Alliance (PNA), and IEEE 1394 and wireless home network technologies including Bluetooth, Ultra Wide Band (UWB), ZigBee, Wireless 1394, Home Radio Frequency (RF), ultrasonic communication, and Z-Wave are being used.

For a home network system, a function of controlling devices has emerged as a major functionality, and accordingly a tool that allows a user to easily control various devices in a home network is needed.

However, home network systems that have been developed so far adopt a method in which a user selects a control device, such as a remote control, of an intended device and performs key input manipulations multiple times through the selected control device to control the device, which causes great inconvenience.

Therefore, there is needed a method for a user to conveniently control an intended device in a home network system.

SUMMARY

The present invention provides a method and an apparatus for a user to conveniently control an intended device in a home network system.

Further, the present invention provides a method and an apparatus for controlling a device using the recognition of a motion and an indoor location of a user in a home network system.

A method for controlling a device that provides a service in a first terminal of a home network system according to the present invention includes: receiving motion recognition information from a second terminal within a predetermined time after a motion of the first terminal is recognized; identifying whether the first terminal is located within an effective service range of at least one device; and activating an interface for controlling the at least one device based on the motion recognition information and whether the first terminal is located within the effective service range.

Further, an apparatus for controlling a device that provides a service in a first terminal of a home network system according to the present invention includes: a transceiver that receives motion recognition information from a second terminal within a predetermined time after a motion of the first terminal is recognized; and a controller that identifies whether the first terminal is located within an effective service range of at least one device, and activates an interface for controlling the at least one device based on the motion recognition information and whether the first terminal is located within the effective service range.

The present invention employs indoor location recognition, which enables automatic activation of a control UI when a user is located within a range of a device to control, thereby intuitively and conveniently controlling the device. Further, in the present invention, when an indoor location recognition process is triggered by a specific motion, indoor location recognition is performed only for a short time, and thus a portable terminal or wearable device that is susceptible to power consumption may favorably perform indoor location recognition. In addition, the present invention enables a plurality of terminals and a single terminal to perform motion recognition, thereby accurately determining a user's intent.

Meanwhile, various additional effects may be implicitly or explicitly disclosed in the detailed description of the following embodiments of the present invention.

DETAILED DESCRIPTION

Hereinafter, an exemplary embodiment of the present invention will be described in detail with reference to the accompanying drawings. In the following description, it should be noted that only portions required for comprehension of operations according to the embodiments of the present invention will be described and descriptions of other portions will be omitted not to make subject matters of the present invention obscure.

The gist of the present invention is to perform an indoor location recognition process when a user makes a specific motion, and to activate a User Interface (UI) on a terminal when the user is located in a service range of a device to control, through motion recognition using a sensor installed in the terminal in a home network system. A motion of the user may be recognized by one terminal and may also be recognized through synchronized motion recognition by a plurality of synchronized terminals to improve accuracy and convenience.

To this end, a method and an apparatus for controlling a device in a home network system according to an embodiment of the present invention will be described in detail. Hereinafter, an embodiment of the present invention illustrates the recognition of a synchronized motion between a plurality of terminals with reference to the drawings. Meanwhile, in the motion recognition performed by one terminal, the terminal may activate an indoor location recognition module without a synchronization operation when a specific motion is detected.

Figure 1:
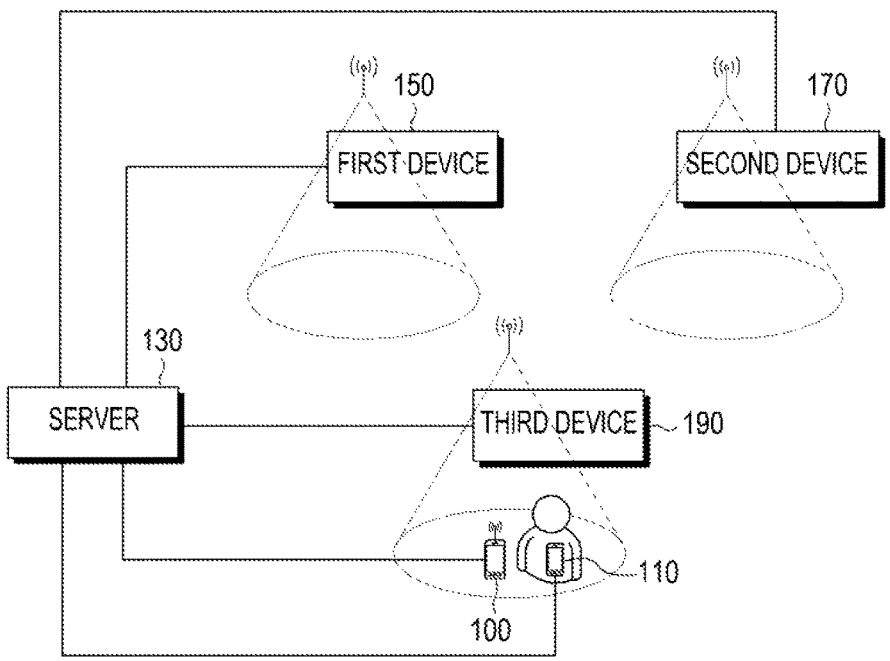
FIG. 1 illustrates a home network system according to an embodiment of the present invention.

FIG. 1 illustrates a home network system according to an embodiment of the present invention.

Referring to FIG. 1, a first device 150, a second device 170, and a third device 190 are included in a home network, and a server 130 is a local server that manages all the devices 150, 170, and 190 and a main terminal 100, which are included in the home network. Here, the first device 150, the second device 170, and the third device 190 may be home appliances, such a television, a washing machine, a computer, and a refrigerator, and a service provided from each device may be controlled by the main terminal 100 within a predefined effective service range.

Each of the main terminal 100 and a sub-terminal 110 recognizes a motion from sensor data output from a sensor that has detected a user motion. The sub-terminal 110 transmits a motion recognition event including motion information on the recognized motion to the main terminal 100 in order to accurately understand user intent and recognize a user gesture.

When the main terminal 100 itself recognizes a motion and receives a motion recognition event, which includes motion information generated within a predetermined effective time, from the sub-terminal 110, the main terminal 100 recognizes that a user intends to control at least one device. In the embodiment of the present invention, the main terminal 100 recognizes a motion and then transmits, to the sub-terminal 110, a request message for requesting a motion recognition event relating to motion recognition performed within an effective time. The request message includes at least one of the effective time and an identifier of the main terminal 100. When the sub-terminal 110 recognizes the motion within the effective time, the sub-terminal 110 transmits a motion recognition event to the main terminal 100.

When the motion recognition event is received from the sub-terminal 110, the main terminal 100 recognizes that the user intends to control at least one device. The effective time refers to time included in at least one of time ranges before and after the time the motion is recognized by the main terminal 100.

Here, recognizing a motion to control at least one device by the main terminal 100 and the sub-terminal 110 is defined as recognizing a synchronized motion.

When the main terminal 100 recognizes a synchronized motion, the main terminal 100 transmits, to the server 130, an indoor location recognition request message for requesting indoor location recognition.

Here, the effective service range refers to an effective service range for controlling each of the devices 150, 170, and 190 connected to the home network that is controlled, which is defined in advance according to initial system settings. A predefined effective service range for each device may change according to a user's setting in the main terminal 100.

Geo-Fencing is used to recognize whether the main terminal 100 and the sub-terminal 110 are located in an effective service range of a specific device. Further, the indoor location recognition is not always detected by the main terminal 100 and the server 130 but is activated only for a certain effective time after a synchronized motion is recognized.

That is, as described above, when the main terminal 100 recognizes a synchronized motion and transmits an indoor location recognition request message to the server 130, the server 130 instructs the connected devices 150, 170, and 190 to recognize an indoor location. Then, the devices 150, 170, and 190 each transmit information including a device ID and an effective service range to the main terminal 100 through the server 130 using a beacon message.

Here, in recognizing an indoor location, radio communication technologies that enable indoor location recognition, such as Zigbee, Z-Wave, BlueTooth, BlueTooth Low Energy (BLE), and ultrasonic communication, are used for communications between the devices 150, 170, and 190 and the main terminal 100. Further, a radio communication technology for recognizing a predefined synchronized motion is used between the sub-terminal 110 and the main terminal 100.

The main terminal 100 calculates a distance between each device and the main terminal 100 using short-range communication and identifies whether the main terminal 100 is located within an effective service range of at least one device, based on the information including the device ID and the effective service range received through the server 130 from the devices 150, 170, and 190.

Here, effective service ranges for the devices 150, 170, and 190 to provide a service may change according to a user's setting. An effective service range for providing a service is defined in advance for each of the devices 150, 170, and 190, and information on the effective service range is transmitted to the main terminal 100 through a beacon message. Here, when modifying the effective service ranges for the respective devices 150, 170, and 190 to provide a service, the main terminal 100 may perform the following modification process.

The main terminal 100 displays an effective service range of each device in a setting menu of an application for controlling a device and displays a UI for modifying the effective service range. For example, when the user changes an effective service range of the device 150, which is set to 5 m, to 3 m through the UI, the main terminal 100 modifies the effective service range to 3 m and stores the modified effective service range in a Data Base (DB) of the application. In this case, when the device 150 transmits an effective service range of 5 m to the main terminal 100 through a beacon message, the main terminal 100 receives the beacon message from the device 150. However, the main terminal 100 identifies that the effective service range is changed to 3 m upon retrieving the DB of the application, deletes effective service information included in the beacon message, and recognizes a location based on the effective service range updated in the DB of the application. Here, the effective service range is not updated directly in the device 150 but the updated effective service range is stored in the DB of the application by the main terminal 100 because each user may want a different effective service range and it prevents another user from changing the effective service range.

Referring back to FIG. 1, as a result of indoor location recognition, when the main terminal 100 is located within an effective service range of the third device 190, the main terminal 100 activates a UI for controlling the third device 190 on a display.

Meanwhile, although not shown in FIG. 1, when the main terminal 100 is located within effective service ranges of two or more devices, the main terminal 100 may activate an additional UI for the user to select a device to control before activating a control UI for a corresponding device. When the user selects a device to control, the main terminal 100 activates a control UI for the selected device.

Figure 2:
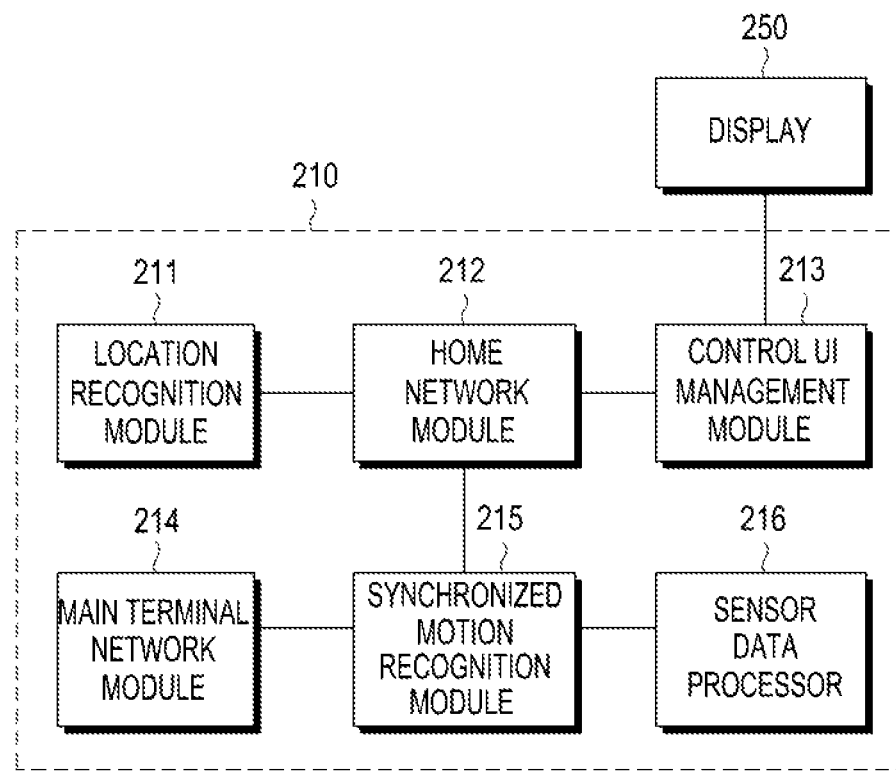
FIG. 2 illustrates a configuration of a main terminal 100 in the home network system according to an embodiment of the present invention.

FIG. 2 illustrates a configuration of the main terminal 100 in the home network system according to an embodiment of the present invention.

Referring to FIG. 2, the main terminal 100 includes a controller 210 and a display 250, and the controller 210 includes a location recognition module 211, a home network module 212, a control UI management module 213, a main terminal network module 214, a synchronized motion recognition module 215, and a sensor data processor 216.

The sensor data processor 216 detects a user motion using a motion sensor installed in the main terminal 100 and recognizes the motion using sensor data on the detected motion. The sensor data processor 216 transmits motion information on the recognized motion to the synchronized motion recognition module 215.

The synchronized motion recognition module 215 receives the motion information from the sensor data processor 216 and transmits, to the sub-terminal 110 through the network module 214, a request message for requesting a motion recognition event relating to motion recognition occurring within a predetermined effective time. When the motion recognition event including motion information generated within the effective time is received from the sub-terminal 110 through the network module 214 of the main terminal 100, the synchronized motion recognition module 215 transmits, to the home network module 212, a synchronized motion recognition event that indicates a synchronized motion is recognized.

The synchronized motion recognition module 215 may identify whether the motion information transmitted from the sensor data processor 216 and the motion information included in the motion recognition event transmitted from the sub-terminal 110 are predefined motions. That is, the main terminal 100 and the sub-terminal 110 recognize predefined motions through respective sensor data processors thereof. When the motion information transmitted from the sensor data processor 216 and the motion information transmitted from the sub-terminal 110 through the network module 214 of the main terminal 100 are generated within the effective time, the synchronized motion recognition module 215 of the main terminal 100 recognizes that a synchronized motion occurs.

For example, suppose that when picking up a cellular phone with a hand in a bracelet-type wearable device, the user wants to control a device. Here, the bracelet-type wearable device is the sub-terminal 110, and the cellular phone is the main terminal 100. Suppose that a predefined motion of the sub-terminal 110 is in a range of predefined triaxial position values of the bracelet that are generated when the user looks at the screen, holding the cellular phone, and a motion of a predefined threshold size or lower is maintained on each axis for a certain period of time (defined as "Motion A"). In addition, suppose that a predefined motion of the main terminal 100 is in a range of triaxial position values of the cellular phone that are generated when the user makes a motion of picking up the cellular phone (defined as "Motion B1") to see the screen and looks at the screen, and a motion of a predefined threshold size or lower is maintained on each axis for a certain period of time (defined as "Motion B2").

On this supposition, the sensor data processor 216 and the synchronized motion recognition module 215 of the main terminal 100 recognizes a synchronized motion in the following case. Defining time when Motion B1 occurs as T(mb1) and time when Motion B2 occurs as T(mb2), the sensor data processor 216 of the main terminal 100 recognizes the motion when T(mb1)<T(mb2) and T(mb2)−T(mb1) is a predefined threshold time or smaller.

Further, defining time when Motion B is detected as T(mb) and time when Motion A of the sub-terminal 110 is detected as T(ma), the synchronized motion recognition module 215 of the main terminal 100 recognizes the synchronized motion when a time difference between T(ma) and T(mb) is a predefined threshold time or smaller (that is, when the synchronized motion occurs within an effective time), and transmits a synchronized motion event to the home network module 212.

When the synchronized motion recognition event is received from the synchronized motion recognition module 215, the home network module 212 transmits, to the server 130, a location recognition request message for activating indoor location recognition of the devices 150, 170, and 190 and instructs the location recognition module 211 of the main terminal 100 to perform indoor location recognition.

The location recognition module 211 receives information including a device ID and an effective service range from the devices 150, 170, and 190 through the server 130. The location recognition module 211 calculates distances between the main terminal 100 and the devices 150, 170, and 190 using strengths of radio signals or Round Trip delay Time (RTT) between the main terminal 100 and the devices 150, 170, and 190 based on the received information, thereby identifying whether the main terminal 100 is located in an effective service range of at least one device, based on the received information. When it is determined that the main terminal 100 is located in the effective service range of the at least one device, the location recognition module 211 instructs the control UI management module 213 to activate a control UI of the device. The control UI management module 213 displays the control UI of the device.

Here, as described above, when the main terminal 100 is located within effective service ranges of two or more devices, the control UI management module 213 may activate an additional UI for the user to select a device to control before activating a control UI for a corresponding device.

When the user selects a device to control, the control UI management module 213 activates a control UI for the selected device.

Meanwhile, even in a case where the user does not want to control a device but makes a motion corresponding to a synchronized motion recognition condition, when the synchronized motion recognition module 215 recognizes a synchronized motion and the location recognition module 211 determines that the main terminal 100 is located in an effective service range of at least one device, the control UI module 213 may activate a control UI. As such, when a control UI is activated even though the user does not want to control a device, the user may be inconvenienced in using a terminal. To minimize a user's inconvenience, the control UI management module 213 may operate as follows.

The control UI management module 213 may activate a control UI according to when the screen of the main terminal 100 is turned on and turned off, in which case a mode of activating a control UI may be set up by the user on the setting menu.

First, when the screen of the main terminal 100 is turned off, the control UI management module 213 activates a control UI on the entire screen or on a portion of the screen according to a user's setting. In the mode of activating the control UI on the entire screen, when the main terminal 100 recognizes a synchronized motion and is determined to be located in an effective service range of at least one device, the control UI management module 213 automatically activates a control UI of the device on the entire screen. In the mode of activating the control UI on the portion of the screen, when the main terminal 100 recognizes a synchronized motion and is determined to be located within an effective service range of at least one device, the control UI management module 213 receives, from the user, confirmation (that is, input) whether to activate a control UI of the device on the portion of the screen for a certain period of time, and activates the control UI of the device on the entire screen upon receiving confirmation from the user.

When the screen of the main terminal 100 is turned on, the control UI management module 213 activates a control UI on the entire screen or activates a notification window on an upper portion of the screen of the main terminal 100 according to a user's setting. In the mode of activating the control UI on the entire screen, in the same manner as when the screen of the main terminal 100 is turned off, when the main terminal 100 recognizes a synchronized motion and is determined to be located in an effective service range of at least one device, the control UI management module 213 automatically activates a control UI of the device on the entire screen. In the mode of activating the notification window on the upper portion of the screen of the main terminal 100, when the main terminal 100 recognizes a synchronized motion and is determined to be located within an effective service range of at least one device, the control UI management module 213 activates a notification window (for example, a notification bar) on an upper portion of the screen of the main terminal 100, and activates a control UI upon receiving a selection to activate the UI of the device from the user through the activated notification window. Here, the user may touch a corresponding icon or may drag and drop the notification window in order to select to activate the UI of the device through the activated notification window.

Figure 3:
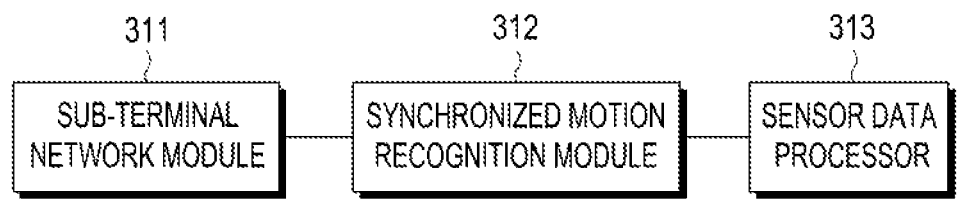
FIG. 3 illustrates a configuration of a sub-terminal 110 in the home network system according to an embodiment of the present invention.

FIG. 3 illustrates a configuration of the sub-terminal 110 in the home network system according to an embodiment of the present invention.

Referring to FIG. 3, the sub-terminal 110 includes a sub-terminal network module 311, a synchronized motion recognition module 312, and a sensor data processor 313.

The sensor data processor 313 detects a user motion using a motion sensor installed in the sub-terminal 110 and recognizes the motion using sensor data on the detected motion. The synchronized motion recognition module 312 receives a request message for requesting a motion recognition event relating to motion recognition occurring within an effective time from the main terminal 100, and identifies whether the sensor data processor 313 performs motion recognition occurs within the effective time. When the sensor data processor 313 performs motion recognition within the effective time, the synchronized motion recognition module 312 transmits a motion recognition event including motion information on the motion recognized by the sensor data processor 313 to the main terminal 100 through the sub-terminal network module 311.

Figure 4:
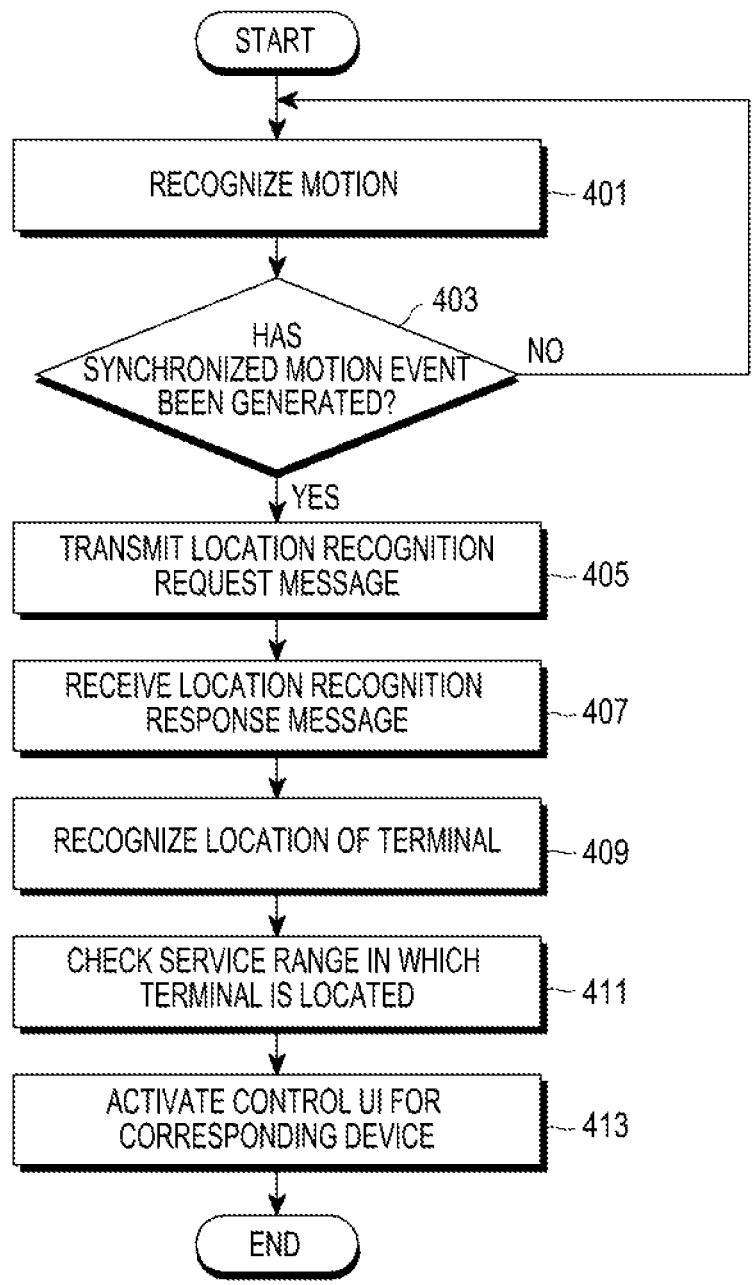
FIG. 4 illustrates a method in which the main terminal 100 of the home network system controls a device according to an embodiment of the present invention.

FIG. 4 illustrates a method in which the main terminal 100 of the home network system controls a device according to an embodiment of the present invention. Hereinafter, a sequential method in which the main terminal 100 recognizes a motion and a location of the user and activates a control UI of a device to control is described with reference to FIG. 4.

Referring to FIG. 4, the main terminal 100 detects a user motion using the installed motion sensor and recognizes the motion using sensor data on the detected motion (401). The main terminal 100 performs the motion recognition and identifies whether a motion recognition event including motion information generated within a predetermined effective time is received from the sub-terminal 110 (403). That is, when the main terminal 100 performs the motion recognition and receives the motion recognition event including the motion information generated within the predetermined effective time from the sub-terminal 110, the main terminal 100 confirms that a synchronized motion event occurs.

For example, when the user makes a motion of picking up a cellular phone (that is, a main terminal) with a hand in an accessory-type terminal (that is, a sub-terminal) and a motion of looking at the screen in front of a television, the main terminal determines that the user intends to control the television and displays a television control UI on the cellular phone. Here, when the sub-terminal recognizes a defined motion using sensor data and transmits motion information to the main terminal, information on the time when a motion is detected and a motion type may be specified in the motion information. The main terminal compares motion information calculated based on sensor data acquired by the main terminal with the motion information from the sub-terminal to recognize a synchronized motion.

When the synchronized motion event occurs, the main terminal 100 transmits, to the server 130, a location recognition request message for requesting indoor location recognition of the devices 150, 170, and 190 (405).

The main terminal 100 receives a location recognition response message including a device ID and an effective service range from the devices 150, 170, and 190 through the server 130 (407).

The main terminal 100 calculates a distance between each device and the main terminal 100 using short-range communication (409) and identifies whether the main terminal 100 is located within an effective service range of at least one device (411), based on information included in the received location recognition response message.

The main terminal 100 activates a control UI of a device corresponding to the identified effective service range on the display (413). Here, the main terminal 100 stores the control UI for controlling the device in advance in the DB of the application.

Thus, the present invention employs indoor location recognition, which enables the automatic activation of a control UI when a user is located within a range of a device to control, thereby intuitively and conveniently controlling the device. Further, in the present invention, when an indoor location recognition process is triggered by a specific motion, indoor location recognition is performed only for a short time, and thus a portable terminal or wearable device that is susceptible to power consumption may favorably perform indoor location recognition. In addition, the present invention enables a plurality of terminals and a single terminal to perform motion recognition, thereby accurately determining a user's intent.

Although the embodiment has been described in the detailed description of the present invention, the present invention may be modified in various forms without departing from the scope of the present invention. Thus, the scope of the present invention shall not be determined merely based on the described exemplary embodiments and rather determined based on the accompanying claims and the equivalents thereto.

The invention claimed is:

1. A method for controlling at least one device that provides a service to a first terminal of a home network system, the method comprising:
    receiving, from a second terminal within a predetermined time, information on a motion of a user identified by the second terminal;
    receiving, from the at least one device, information on an effective service range of the at least one device;
    identifying whether the first terminal is located within the effective service range based on the information on the effective service range; and
    activating an interface for controlling the at least one device based on the information on the motion and the result of the identification of whether the first terminal is located within the effective service range.

2. The method as claimed in claim 1, further comprising determining whether a motion synchronized with the first terminal occurs in the second terminal based on the information on the motion, wherein when the synchronized motion occurs, the interface is activated.

3. The method as claimed in claim 1, wherein the first terminal is a main terminal, and the second terminal is a sub-terminal.

4. The method as claimed in claim 1, wherein the identifying of whether the first terminal is located within the effective service range of the at least one device comprises:
    transmitting a location recognition request message for recognizing a location of the at least one device to a server;
    receiving a location recognition response message comprising an identification (ID) and an effective service range of each device from the server; and
    identifying whether the first terminal is located in the effective service range of the at least one device based on the ID and the effective service range of each device comprised in the location recognition response message.

5. The method as claimed in claim 1, wherein, when the first terminal is located in effective service ranges of a plurality of devices, an interface for selecting one of the plurality of devices is activated and then an interface for controlling the selected device is activated.

6. The method as claimed in claim 1, wherein the effective service range is set up in each terminal according to a user's setting.

7. The method as claimed in claim 1, further comprising transmitting a request message for requesting the information on the motion to the second terminal, wherein the request message comprises at least one of information on the predetermined time and an identifier of the first terminal.

8. An apparatus for controlling a device that provides a service to a first terminal of a home network system, the apparatus comprising:
    a transceiver configured to:
        receive, from a second terminal within a predetermined time, information on a motion identified by the second terminal, and
        receive, from at least one device, information on an effective service range of the at least one device; and
    a controller configured to:
        identify whether the first terminal is located within the effective service range based on the information on the effective service range, and
        activate an interface for controlling the at least one device based on the information on the motion and the result of the identification of whether the first terminal is located within the effective service range.

9. The apparatus as claimed in claim 8, wherein the controller determines whether a motion synchronized with the first terminal occurs in the second terminal based on the information on the motion, and activates the interface when the synchronized motion occurs.

10. The apparatus as claimed in claim 8, wherein the first terminal is a main terminal, and the second terminal is a sub-terminal.

11. The apparatus as claimed in claim 8, wherein the controller is further configured to:
    control the transceiver to transmit a location recognition request message for recognizing a location of the at least one device to a server and to receive a location recognition response message comprising an identification (ID) and an effective service range of each device from the server, and
    identify whether the first terminal is located in the effective service range of the at least one device based on the ID and the effective service range of each device comprised in the location recognition response message.

12. The apparatus as claimed in claim 8, wherein, when the first terminal is located in effective service ranges of a plurality of devices, the controller activates an interface for selecting one of the plurality of devices and then activates an interface for controlling the selected device.

13. The apparatus as claimed in claim 8, wherein the effective service range is set up in each terminal according to a user's setting.

14. The apparatus as claimed in claim 8, wherein the transceiver transmits a request message for requesting the information on the motion to the second terminal, and the request message comprises at least one of information on the predetermined time and an identifier of the first terminal.

* * * * *